No. 753,759. PATENTED MAR. 1, 1904.
E. G. THOMAS.
ELECTRICAL CONNECTION.
APPLICATION FILED JULY 15, 1902.
NO MODEL.
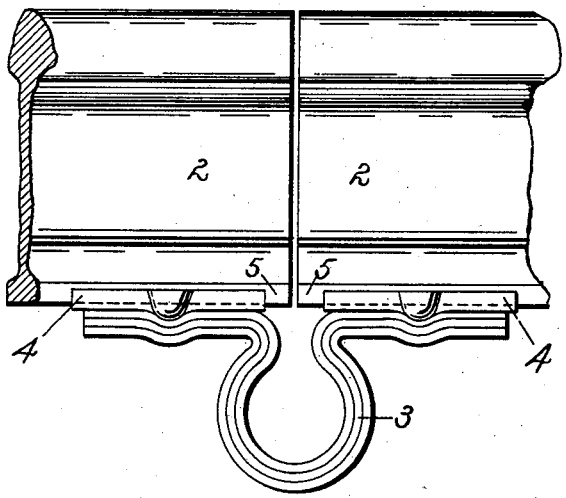
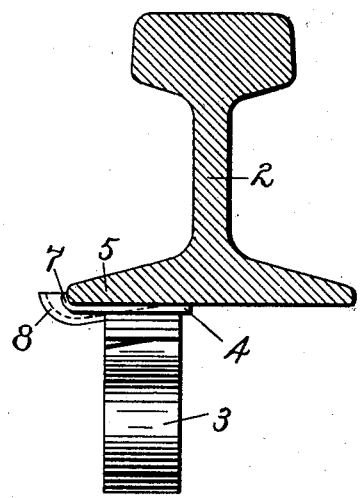
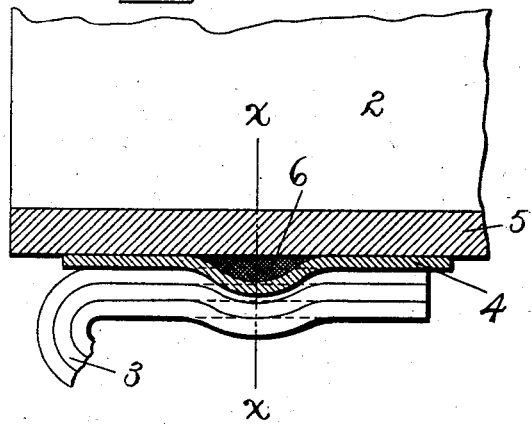
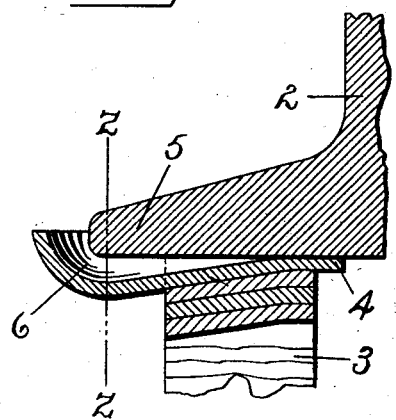
WITNESSES
Edward H. Temple.
Wm H. Boynton
INVENTOR
Edward G. Thomas No. 753,759. Patented March 1, 1904.

UNITED STATES PATENT OFFICE.

EDWARD G. THOMAS, OF CAMBRIDGE, MASSACHUSETTS.

ELECTRICAL CONNECTION.

SPECIFICATION forming part of Letters Patent No. 753,759, dated March 1, 1904.

Application filed July 15, 1902. Serial No. 115,633. (No model.)

*To all whom it may concern:*

Be it known that I, EDWARD G. THOMAS, a citizen of the United States, and a resident of Cambridge, in the county of Middlesex and State of Massachusetts, have invented certain new and useful Improvements in Electrical Connections, of which the following is a specification.

In soldering rail-bonds or similar connections to the rails of electric railways it is customary to attach the bonds to the side or bottom surfaces of the ends of the rails, and in soldering a bond to the bottom surfaces of a pair of rails it has hitherto been necessary first to tin the surface of those portions of the rails to which the bond is to be applied, then to clamp the bond to the rails, then to heat the rails and bond, and finally to apply the flux and solder at the edge of the meeting surfaces, from which point said materials are drawn in between said surfaces chiefly by capillary attraction. The parts are then allowed to cool and the clamps are removed. Owing to the horizontal position and almost inaccessible location of the surfaces to be soldered together and to the resulting tendency of the melted solder to flow around or fall away from the parts to be soldered instead of flowing in between the same, and to the further fact that the melted solder being exposed to the air on practically all sides when first applied is rapidly oxidized and cooled, so that it tends to harden prematurely, and thus to obstruct the flow of the solder to the desired points, the process above described has proved in practice to be so difficult and expensive that it has become customary to join a number of rails together and tip them bottom up and then to bond them while in this position, the section of rails thus bonded being then turned upright and set in place. Even with this method of procedure, however, the section of rails thus bonded must still be connected to the adjacent sections after having been set in place on the ties, so that the difficulties above pointed out can be only partially overcome in this manner.

My present invention is intended to provide a rail-bond or other electrical connection so constructed that it may be quickly and easily attached to the bottom surfaces of the rails without making it necessary to tip the rails bottom up and bond them in sections, as above described, and to this end I provide a bond or connection which has its attaching surface or surfaces each provided with a groove or recess so located as to lead from some accessible point at one side of the rail-flange to a point within the interior of the area defined by the meeting surfaces of the connection and rail, which groove or recess forms a well-defined channel through which the soldering acid and solder may be introduced with ease and certainty between the parts to be soldered. By preference the attaching-surface of the connection is extended or prolonged sufficiently to cause it to project somewhat beyond the edge of the rail-flange in order that the connection itself may be located more nearly under the center of the rail.

My invention is illustrated in the accompanying drawings as embodied in a rail-bond, in which drawings—

Figure 1 is a side elevation of the adjacent ends of two rails, showing also an attached bond. Fig. 2 is a transverse section through one of the rails shown in Fig. 1, but showing the bond in end elevation. Fig. 3 is a transverse section through a portion of a rail with my bond attached, taken on the line $x\,x$ in Fig. 4; and Fig. 4 is a longitudinal section taken on the line $z\,z$ in Fig. 3.

Referring to the drawings, 2 2 represent the adjacent ends of a pair of rails, and 3 represents a rail-bond of any suitable type, the bond herein shown being a laminated bond composed of superposed strips of copper soldered together at the ends of the bond, this being a construction well known in the art. According to my preferred construction a supplementary strip 4 is soldered to the upper surface of each end of the bond 3, each strip 4 being made enough wider than the bond itself to cause said strip to project somewhat beyond the edge of the corresponding rail-flange 5 when the bond is properly located with respect to said flange. Each strip 4 is provided with a groove or recess 6 in its upper or attaching surface, as by stamping the end of the bond with the strip 4, attached in suitable dies, which recess leads from about the center of the attaching-surface of said strip outward to a point adjacent to the edge of the rail-flange 5. The outwardly-projecting edge of the strip 4 is bent upward against the edge of said flange on either side of the recess 6, as shown at 7, thus forming a lip 8, which forms the outer walls of said recess at its outer end. As thus constructed my bond is attached to the rails 2 by clamping it to the bottom surfaces thereof in the usual manner, heating the ends of the bond and adjacent portions of the rails, and running the soldering materials—that is to say, the flux and solder—into the outer end of the recess 6, whence said materials flow through the channel formed thereby, and thence laterally between the meeting surfaces of the bond and rails until the solder reaches the boundaries of said surfaces, where it hardens and ceases to flow. The parts are then allowed to cool and the clamps are removed.

Inasmuch as the channel above referred to is surrounded by metallic parts which are heated during the soldering process, the solder which is run into it is kept fluid, and thus prevented from hardening where it is not wanted and obstructing the flow. The tendency of the melted solder to oxidize is also much diminished, as it is protected by the surrounding walls of the channel with which it is in contact, and since the solder cannot escape from the channel except by passing between the surfaces to be united its application to said surfaces is assured and all danger of its running to waste is avoided. It is unnecessary and undesirable to tin the attaching-surfaces of the rails themselves, but it is desirable to tin the attaching-surfaces of the bonds, as is the common custom.

My present invention is not limited to any particular form, type, or style of electrical connection, nor to any particular arrangement for providing the desired channels in its attaching-surfaces, so long as said channels are each adapted to extend from some accessible point beyond the edges of the rails to the interior of the areas defined by the meeting surfaces of the connection and rails.

A bond may evidently be constructed in accordance with my present invention at one of its ends only, in which case the other end of the bond can be attached to the rail by inverting the latter and attaching said end of the bond thereto in the manner heretofore practiced, and I consider that such a construction would be within the scope of my invention.

I claim as my invention—

1. An electrical connection having an attaching-surface adapted to make contact over the greater portion of its area with the surface of a rail and provided with a depression adapted to form, in connection with said rail-surface, a channel open and accessible at its outer end and leading to the interior of said area, substantially as described.

2. An electrical connection having an attaching-surface extending laterally beyond the connection proper and adapted to make contact over the greater portion of its area with the surface of a rail, said attaching-surface being provided with a depression adapted to form, in connection with said rail-surface, a channel open and accessible at its outer end and leading to the interior of said area, substantially as described.

3. An electrical connection provided at its point of attachment with a supplementary strip adapted to make contact over the greater portion of its area with the surface of a rail, said strip having a depression formed in its attaching-surface and extending from one edge of the strip to a point within the boundaries thereof.

4. A rail-bond provided at one or both of its points of attachment with a supplementary strip extending laterally beyond the edge of the bond proper and adapted to make contact over the greater portion of its area with the surface of a rail, said strip having a depression formed in its attaching-surface and extending from one edge of the strip to a point within the boundaries thereof.

In testimony whereof I have hereunto subscribed my name this 10th day of July, 1902.

EDWARD G. THOMAS.

Witnesses:
E. D. CHADWICK,
RUBY M. BANFIELD.